United States Patent [19]
Zeller et al.

[11] Patent Number: 6,120,831
[45] Date of Patent: Sep. 19, 2000

[54] SOLUBLE COFFEE HAVING INTENSIFIED FLAVOR AND COLOR AND METHOD OF MAKING SAME

[75] Inventors: Bary Lyn Zeller, Brookfield, Conn.; Joanne Marie Langdon, Pelham, N.Y.; Gregory Aaron Wiseman, New York, N.Y.; Evan Joel Turek, Brewster, N.Y.

[73] Assignee: Kraft Foods, Inc., Northfield, Ill.

[21] Appl. No.: 09/149,979

[22] Filed: Sep. 9, 1998

[51] Int. Cl.[7] .................................. A23F 5/00; A23B 4/03
[52] U.S. Cl. ............................................ 426/594; 426/465
[58] Field of Search ..................................... 426/594, 465

[56] References Cited

U.S. PATENT DOCUMENTS

| | | |
|---|---|---|
| 3,615,666 | 10/1971 | Schlichter et al. . |
| 3,637,397 | 1/1972 | Menzies et al. . |
| 5,079,026 | 1/1992 | Arora et al. . |

FOREIGN PATENT DOCUMENTS

| | | |
|---|---|---|
| WO 94/10852 | 5/1994 | WIPO . |

*Primary Examiner*—Anthony J. Weier
*Attorney, Agent, or Firm*—Thomas A. Marcoux; Thomas R. Savoie

[57] ABSTRACT

A method of intensifying the flavor of soluble coffee. Soluble coffee is heated at a temperature and for a time sufficient to intensify the flavor of the coffee without causing carbohydrate pyrolysis characterized by evolution of carbon dioxide. The heated coffee is cooled to produce a soluble coffee product having intensified flavor. The flavor intensity of soluble coffee can be increased without deleteriously altering coffee flavor by heating the coffee at a temperature under conditions that do not cause carbohydrate pyrolysis characterized by generation of carbon dioxide.

18 Claims, 3 Drawing Sheets

SOLUBLE COFFEE HAVING INTENSIFIED FLAVOR AND COLOR AND METHOD OF MAKING SAME

FIELD OF THE INVENTION

The present invention relates to soluble coffee having intensified flavor and color and to methods of heat treating soluble coffee to intensify the flavor and color thereof without deleteriously altering the flavor of the coffee.

BACKGROUND OF THE INVENTION

Soluble coffee products, often referred to as "instant coffee", are prepared from aqueous extracts of roasted and ground coffee. The products are generally in the form of spray dried or freeze dried particulate solids.

The process of making soluble coffee causes loss of coffee aroma and flavor relative to the roasted and ground coffee from which the soluble coffee was prepared. Various methods have been developed to increase the aroma and yield of soluble coffee. For example, coffee aroma recovered during coffee roasting is often added to soluble coffee products. It is also known that the yield of conventional soluble coffee (e.g., spray dried powder having a moisture content of about 2–3% by weight) can be increased by heating instant coffee at a temperature sufficiently high to melt the coffee and to cause pyrolysis of carbohydrates resulting in generation of carbon dioxide. This method is described in International Patent Application No. PCT/US93/10405 published May 26, 1994 as No. WO 94/10852 (hereinafter WO '852). Generation of carbon dioxide in the melt causes the melt to foam. The foam is then solidified by cooling and comminuted to form a foamed particulate soluble coffee product.

The heating process causes significant weight loss, on the order of about 7–10% by weight in addition to loss of water. It is reported in WO '852 that the weight of the foamed product needed to prepare a serving of coffee beverage is reduced by 30–50% relative to the amount of conventional soluble coffee products, such as spray dried coffee powder, required to prepare a serving of the same size. However, quality of the beverage is not reported.

SUMMARY OF THE INVENTION

The present invention provides a method of intensifying the flavor of particulate soluble coffee which comprises heating particulate soluble coffee powder at a temperature and for a time sufficient to intensify the flavor of the coffee without causing carbohydrate pyrolysis characterized by evolution of carbon dioxide, and cooling the heated coffee to produce a soluble coffee product having intensified flavor. We have found that color is typically darkened in proportion to flavor intensification. Darker color connotes to the average consumer a richer coffee product. We have found that if heating is carried out under conditions of time and temperature that result in generation of carbon dioxide in accordance with the method described in WO '852, the flavor of beverages prepared from the heat-treated product have a deleteriously altered flavor profile. We have found that the flavor intensity of soluble coffee can be increased without deleteriously altering coffee flavor by heating the coffee at a temperature under conditions that do not cause carbohydrate pyrolysis characterized by generation of carbon dioxide.

DESCRIPTION OF PREFERRED EMBODIMENTS

Figure 1:
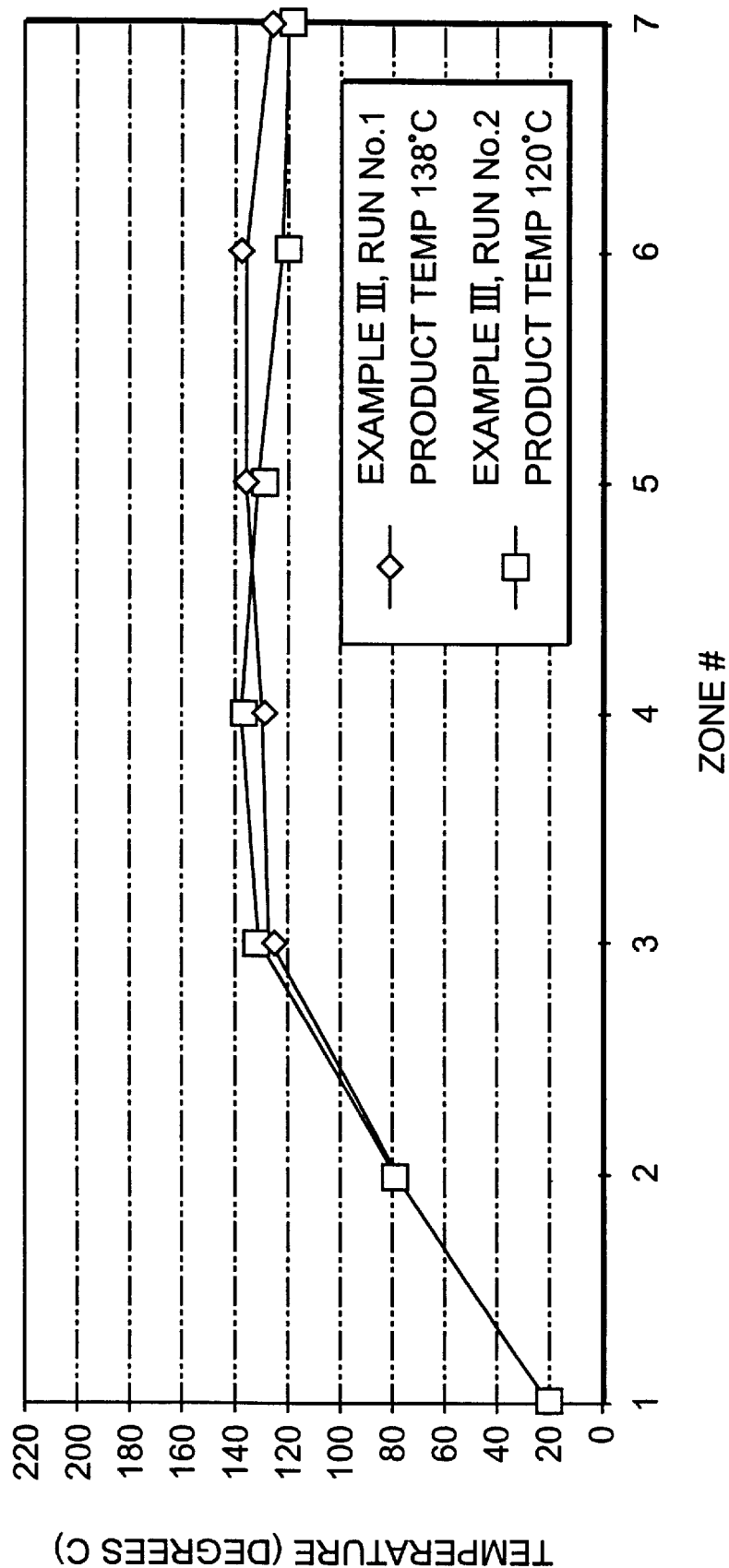
FIG. 1 is a graphical presentation of coffee temperature during extrusion described in Example III.

In accordance with the invention, soluble coffee is heated at a temperature and for a time sufficient to intensify the flavor of the coffee without causing carbohydrate pyrolysis characterized by generation of carbon dioxide. By "soluble coffee" (or "instant coffee") is meant a particulate, solid, water soluble coffee obtained from an aqueous extract of roasted and ground coffee. Virtually any type of soluble coffee derived from any bean type such as Robusta or Arabica, decaffeinated or caffeine-containing as well as soluble coffee solids derived from acid or thermal hydrolysis of spent coffee grounds, can be employed to produce the product of the present invention. The particulate soluble coffee extracts are prepared by drying the aqueous extracts, most often by spray drying or freeze drying. Particle size may be adjusted by agglomeration and is generally not greater than about 5000 $\mu$m, with most commercial soluble coffees having an average particle size of from 250 to 3000 $\mu$m. Moisture content of the soluble coffee is generally not more than about 5% by weight, and typically in the range of 1–4% by weight.

Heating may be effected in any manner, but it is essential to avoid pyrolysis of carbohydrate characterized by evolution of carbon dioxide.

Suitable heating includes conductive heating such as on a hot plate or as the coffee is moved through an extruder, radiant heating, convection oven heating, and microwave heating. It is preferred to conduct the heating step in a continuous manner such as by heating the coffee as it passes through an extruder.

We have found that if heating causes pyrolysis and evolution of carbon dioxide, the quality of coffee beverage is deleteriously altered. We have found that in order to increase flavor intensity without deleteriously altering flavor, it is essential to avoid generation of carbon dioxide caused by pyrolysis of the carbohydrate present in the coffee. In general, heating the coffee to a temperature below about 100° C. is insufficient to significantly intensify coffee flavor, while heating the coffee to a temperature above about 160° C. will rapidly cause pyrolysis and generation of carbon dioxide, resulting in impaired flavor quality. The time sufficient to significantly increase flavor intensity is dependent on the coffee temperature, with longer time being required at lower temperature and less time required at high temperature. It is preferred to increase flavor intensity by a factor of at least 1.1. The extent, or factor, of flavor intensity increase is calculated by dividing the amount of water required to prepare a coffee beverage of a desired flavor intensity from instant coffee after heat treatment in accordance with the present invention by the amount of water required to prepare a coffee beverage of the same flavor intensity and color using the same instant coffee that was employed to make the heat treated product. For example, as reported in Example V, dissolving a coffee beverage made with 2 grams of instant coffee heat treated in accordance with the present invention in 12 ounces of water has the same color and flavor intensity as a coffee beverage made by dissolving 2 grams of the untreated instant coffee in 8 ounces of water. Flavor intensity thus increased by a factor of 12/8 or 1.5. Flavor intensity is preferably increased by a factor of at least 1.3 and more preferably by at least 1.5. We have found that heating soluble coffee to a temperature within the range of about 100–160° C., preferably about 120–150° C., and more preferably to about 130–140° C. for a time within the range of about 0.1–180 minutes, preferably about 0.15–10 minutes, and more preferably about 0.2–5 minutes, is effective in intensifying flavor and color while avoiding loss of flavor quality.

It is preferred, but not essential, to conduct heating at a temperature which causes the soluble coffee to melt.

The maximum time for heating at a particular temperature within the range of 100–160° C. is readily determined by measuring the time required to cause generation of carbon dioxide at that temperature. Similarly, the maximum temperature with the range of 100–160° C. for heating for a particular time period is readily determined by measuring the temperature required to cause generation of carbon dioxide during that time period.

It is preferred to carry out the heating step continuously, and continuous heating is preferably carried out as the soluble coffee is moved through an extruder. Any type of extruder suitable for food processing may be employed. Several known to be suitable for coffee processing are currently available. Conditions in the extruder can be widely varied, provided that the temperature of the coffee being moved through the extruder and the time period of the coffee at elevated temperature are sufficient to intensify flavor without causing carbohydrate pyrolysis and generation of carbon dioxide. External heat may be supplied to the extruder if shear in the extruder is insufficient to cause the coffee to reach target time and temperature. The extruder may be cooled if shear conditions would cause overheating, and a combination of heating and cooling along the length of an extruder barrel may be employed.

Other forms of heating, both continuous and batch, may be employed. For example, the coffee can be continuously conveyed through an oven or may be simply heated on a hot plate. While it is preferred to cause the coffee to melt during heating, melting is not essential. Significant increases in coffee flavor and color can be obtained without melting or with only slight melting.

After the heating step, the heat-treated coffee is cooled. Cooling can be effected by simply allowing the coffee to cool under ambient conditions, or by active cooling.

The particle size of the heat treated product may be adjusted by conventional techniques of comminuting and/or agglomeration. Where heating has caused significant melting, the heat treated product is easily comminuted by light grinding using conventional coffee grinding apparatus. Particle size is preferably the same as that of conventional soluble coffee, generally not more than 5000 $\mu$m. Average particle size is preferably within the range of 250–3000 $\mu$m.

The resulting soluble coffee product has darker color and intensified flavor relative to the starting soluble coffee and its flavor is not deleteriously altered. Typical flavor attributes of soluble coffee products produced by the present invention are reported in Table 5 below and illustrated graphically in FIG. 3.

The heat treatment does not significantly alter the density of the treated coffee after comminution. Bulk density is generally in the range of 0.10 to 0.50 g/cc unless steps are taken to modify the density. Density modification is readily achieved by heating the coffee sufficiently to cause it to melt and injecting a gas, preferably an inert gas such as nitrogen or carbon dioxide, into the melt prior to cooling. For example, gas may be injected into a coffee melt formed in an extruder prior to discharge of the melt from the extruder.

Heat treatment also increases the glass transition temperature of the coffee by about 10–30° C. The glass transition temperature of conventional soluble coffee is typically in the range of 60–70° C. whereas the glass transition temperature of the heat treated coffee is higher by about 10–30° C.

The heat treated product is not foamed as is the product of WO '852 unless gas is injected into the melt as described above.

Moisture content of the heat treated soluble coffee product is generally not more than 5% by weight, preferably not more than 3% by weight, and more preferably not more than 2% by weight based on the weight of the product. Weight loss caused by heating, including loss of moisture, is generally not more than about 8% and is usually less than 5%, based on the total weight of the soluble coffee.

The soluble coffee product is useful by itself as an instant coffee and it may also be used in combination with other ingredients, in the same manner as conventional instant coffee, in formulating other soluble coffee-containing food products. It is preferred to use the soluble coffee product to prepare dry mix sweetened instant coffee products which contain instant coffee, particulate sweetener, and optional ingredients such as flavors, whiteners, and the like.

The amount of instant coffee in such sweetened compositions is generally about 5–30% by weight and preferably about 10–25% by weight, based on the weight of the composition.

Suitable sweeteners for the sweetened products include natural and artificial sweeteners. Suitable natural sweeteners include sugars such as sucrose, dextrose, maltose, fructose, and the like, or combination thereof in an amount of about 20–80% by weight, preferably about 35–65% by weight, based on the weight of the sweetened coffee product.

Artificial sweeteners, such as saccharin, ASPARTAME™, and the like, or mixtures thereof are used in an amount equivalent to 20–80% by weight sucrose. Artificial sweeteners are normally combined with a bulking agent such as maltodextrin, employed in an amount such that the volume of the combined bulking agent and artificial sweetener is approximately the same as the volume of sucrose which provides the same sweetness.

The sweetened product preferably contains a whitener component. Suitable particulate dry mix whiteners include both non-dairy and dairy creamers. The whitener component of the sweetened composition is suitably about 20 to 60% by weight, and preferably about 25 to 50% by weight, based on the weight of the sweetened product.

The sweetened coffee product may be of the instant cappuccino type which foams when reconstituted in hot water. Foaming can be caused by employing a low density (i.e., gas-injected) particulate whitener or by including a chemical carbonation system, or both. Chemical carbonation may be effected by employing a food grade acid such as citric acid or gluconodeltalactone with a carbonate such as potassium or sodium bicarbonate.

A wide variety of flavors, such as hazelnut, mocha, and the like, may be employed in the sweetened coffee product. Various other ingredients may be employed such as foam stabilizing agents, coloring agents, thickeners, etc.

EXAMPLE I

Several 30 g samples of spray-dried coffee powder are placed in 8"×8"-square 2"-deep non-stick baking pans and spread to a uniform thickness of approximately ⅛" depth. The pans are then placed one at a time into a pre-heated model # 1630 VWR Scientific oven for a specific period of time. The coffee powder may melt, to an extent dependent on time-temperature heating conditions, and cools quickly after removal from the oven. Table 1 summarizes the extent of flavor intensification obtained for a variety of conditions.

TABLE 1

| Run No. | Oven Temp. | Heating Time | Relative Flavor Intensity | Relative Color | Flavor Description |
|---|---|---|---|---|---|
| Control | unheated | — | 1x | lightest | mild, earthy, balanced |
| 1 | 90° C. | 20 min. | ≈1.0x | darker | stronger, caramel, less earthy |
| 2 | 100° C. | 20 min. | — | darker | stronger, caramel, less earthy |
| 3 | 110° C. | 20 min. | ≈1.1x | darker | stronger, caramel, less earthy |
| 4 | 120° C. | 20 min. | — | darker | stronger, caramel, less earthy |
| 5 | 130° C. | 20 min. | ≈1.3x | darker | stronger, slightly roasted, less sour |
| 6 | 140° C. | 20 min. | — | darker | stronger, slightly roasted, less sour |
| 7 | 150° C. | 20 min. | ≈1.5x | darker | stronger, slightly roasted, slightly groundsy |
| 8 | 160° C. | 20 min. | — | darker | stronger, slightly burnt, slightly groundsy |
| 9 | 170° C. | 20 min. | N/A | darkest | deleterious flavor, harsh, pyrolyzed, burnt, metallic |
| 10 | 90° C. | 1 hr. | ≈1.1x | darker | stronger, caramel, less earthy |
| 11 | 90° C. | 2 hr. | — | darker | stronger, caramel, less earthy |
| 12 | 100° C. | 1 hr. | ≈1.3x | darker | stronger, caramel, less earthy |
| 13 | 110° C. | 1 hr. | — | darker | stronger, caramel, less earthy |
| 14 | 110° C. | 2 hr. | ≈1.5x | darker | stronger, slightly roasted, less sour |
| 15 | 120° C. | 1 hr. | — | darker | stronger, slightly roasted, less sour |
| 16 | 130° C. | 2 hr. | ≈1.7x | darkest | stronger, slightly roasted, slightly groundsy |

Moderate to long heating times are utilized in this example to ensure that most of the heating occurs at the oven temperatures indicated. Alternatively, it is possible to conduct heating at higher temperatures for shorter periods of time without exceeding these product temperatures. Oven heating can be conducted at oven temperatures up to about 300° C. for periods of time as short as about one minute without exceeding a product temperature of about 160° C., as indicated by a lack of complete coffee melting and the absence of pyrolysis characterized by the evolution of carbon dioxide. Various combinations of time and oven temperature can be used as desired. These conditions will vary as a result of the use of different ovens, different coffee sample size and bed depth, and different rates of heat transfer for ovens, sample container, etc.

EXAMPLE II

Several 30 g samples of spray-dried coffee powder are placed on a 8"×8" glass baking pan and spread to a uniform thickness of approximately ⅛" depth. The pans of coffee are then placed one at a time into a model # R-9360 700 Watt Sharp Carousel II microwave oven pre-set to a specific power level and heated for a specific period of time before removal. As in a convection oven, the coffee powder may melt, to an extent dependent on time-power heating conditions, and cools quickly after removal from the oven. The following table summarizes the extent of intensification obtained for a variety of conditions.

TABLE 2

| Run No. | Microwave Oven | Approximate Coffee Temperature | Heating Time | Relative Flavor Intensity | Relative Color | Flavor Description |
|---|---|---|---|---|---|---|
| Control | unheated | ambient | — | 1x | lightest | mild, earthy, balanced |
| 1 | medium | 110° C. | 10 min. | ≈1.3x | darker | stronger, caramel, less earthy |
| 2 | med-high | 140° C. | 10 min. | ≈1.5x | darker | stronger, slightly roasted, less sour |
| 3 | high | 170° C. | 10 min. | N/A | darkest | deleterious flavor, harsh, pyrolyzed, burnt |

EXAMPLE III

Spray dried instant coffee powder is conveyed into the first zone of a Werner and Pfleiderer C-37 twin screw extruder. The instant coffee powder was heated and melted in the extruder by transfer of energy from the heated extruder zones and by mechanical heating supplied by the shearing action of the screws. Any screw profile which achieves the desired residence time and temperature of the coffee is suitable. The instant coffee powder is one which is derived from a typical roasted coffee extraction process and contains about 2–4% water. A small amount of additional water may be added to the instant coffee powder prior to being introduced into the extruder or by addition into the extruder to reduce viscosity of the melt and decrease the torque requirements of the extruder motor.

Two runs are carried out under the conditions set forth in Table 3. The temperature profile of the extruder zones for each run is shown in FIG. 1.

The extruded coffee melt resembles a glass and is flowable at the exit of the extruder. It is allowed to cool and solidify on a stainless steel tray with circulating ambient air. The solidified coffee is easily ground into a powder with a mortar and pestle or grinding mill to pass through a US #20 screen (0.0331 inch opening). A particular grind size is not required to obtain the benefits of the process. The product of both sets of conditions is evaluated by an experienced panel and found to be higher in overall cup flavor and color. Organoleptic evaluation of the instant coffee is done after reconstituting a sample with 8 oz. of 180° F. water in a beaker. 1.1 g of the product of Run No. 1 and 1.4 g of the product of Run No. 2 is required to achieve a beverage of similar coffee strength compared to 2.0 g of untreated coffee.

TABLE 3

|  | Run No. 1 | Run No. 2 |
| --- | --- | --- |
| Instant Coffee Feed Rate | 8.0 Kg/hr. | 3.9 Kg/hr. |
| Screw Speed | 80 RPM | 32 RPM |
| Extruded Coffee Product Temperature | 138° C. | 120° C. |
| Residence Time in Extruder | 70 seconds | 150 seconds |
| Approximate Cooling Time to 60° C. | 5 minutes | 5 minutes |
| Relative Flavor and Color Intensity | 1.8X | 1.4X |

EXAMPLE IV

Figure 2:
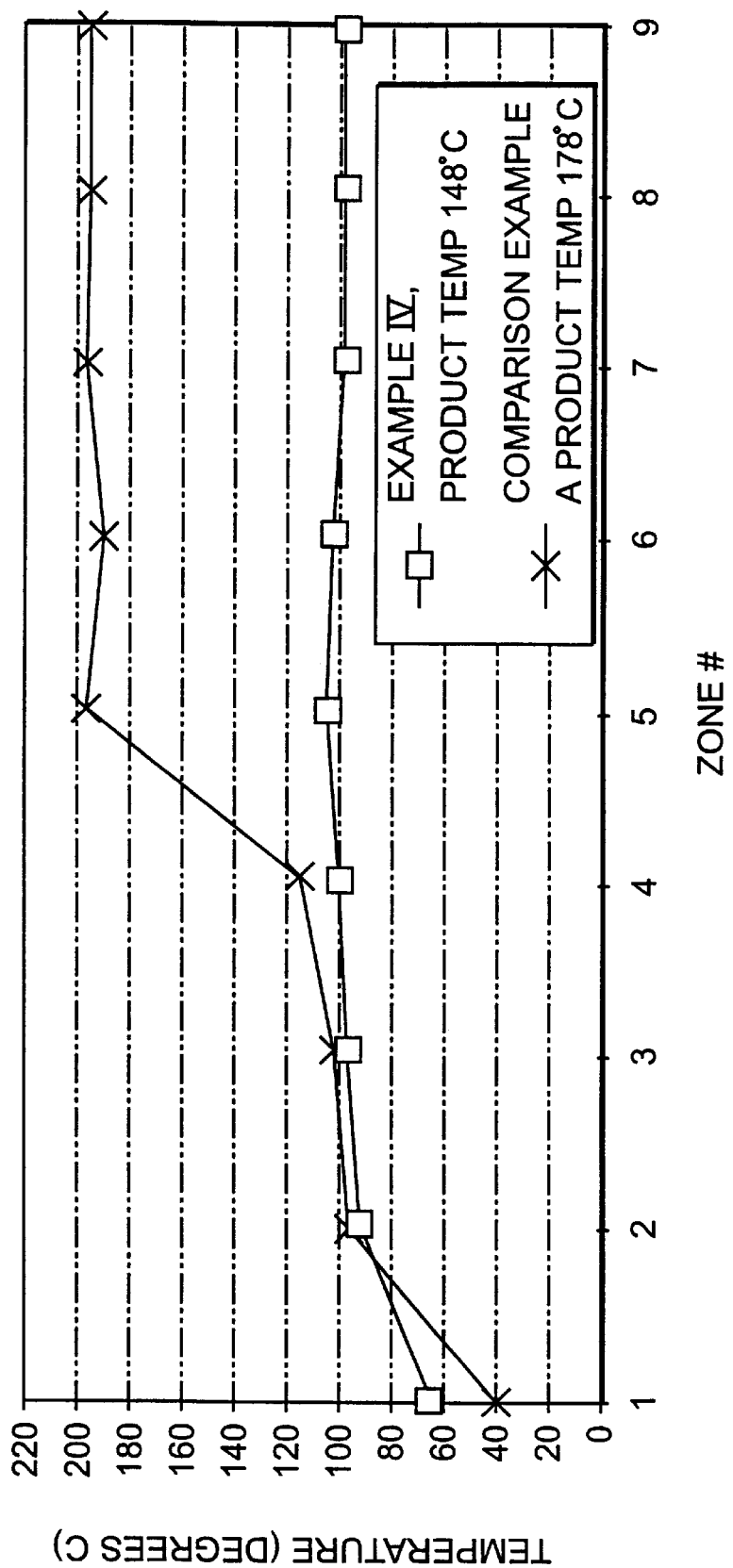
FIG. 2 is a graphical presentation of coffee temperature during extrusion described in Example IV and during extrusion described in Comparison Example A.

The procedure of Example III is repeated, except extrusion is carried out in an APV Baker MPF-50 twin screw extruder under the conditions disclosed in Table 4. The temperature profile of the extruder is shown in FIG. 2.

The extruded melt is deposited continuously on a belt conveyor and cool air is circulated over the extrudate. The solidified coffee is easily ground into a powder with a mortar and pestle or grinding mill to pass through a US #20 screen (0.0331 inch opening). The extruded coffee powder may be utilized at a reduced level in a coffee beverage. 1.3 g of the product is required to achieve a beverage of similar coffee strength compared to 2.0 g of untreated coffee. The resulting coffee beverage is evaluated by experienced personnel after reconstituting 1.3 g of sample with 8 oz. of 180° F. water in a beaker. The product of this invention is judged to have high impact and good quality.

COMPARISON EXAMPLE A

The procedure of Example IV is repeated, except that at a higher temperature under the conditions reported in Table 4. Extrudate temperature is 178° C. and the extruder temperature profile is shown in FIG. 2. The cooled product has a foam structure caused by carbohydrate pyrolysis characterized by evolution of carbon dioxide. The product is judged to be burnt and bitter and of unacceptable quality.

TABLE 4

| EXAMPLE | 4 | Comparison A |
| --- | --- | --- |
| Coffee Feed Rate | 156 Kg/hr. | 27 Kg/hr. |
| Screw Speed | 500 RPM | 60 RPM |
| Extrudate Temperature | 148° C. | 178° C. |
| Residence Time in Extruder | 15 seconds | 180 seconds |
| Approximate Cooling Time to 60° C. | 5 minutes | 5 minutes |

Figure 3:
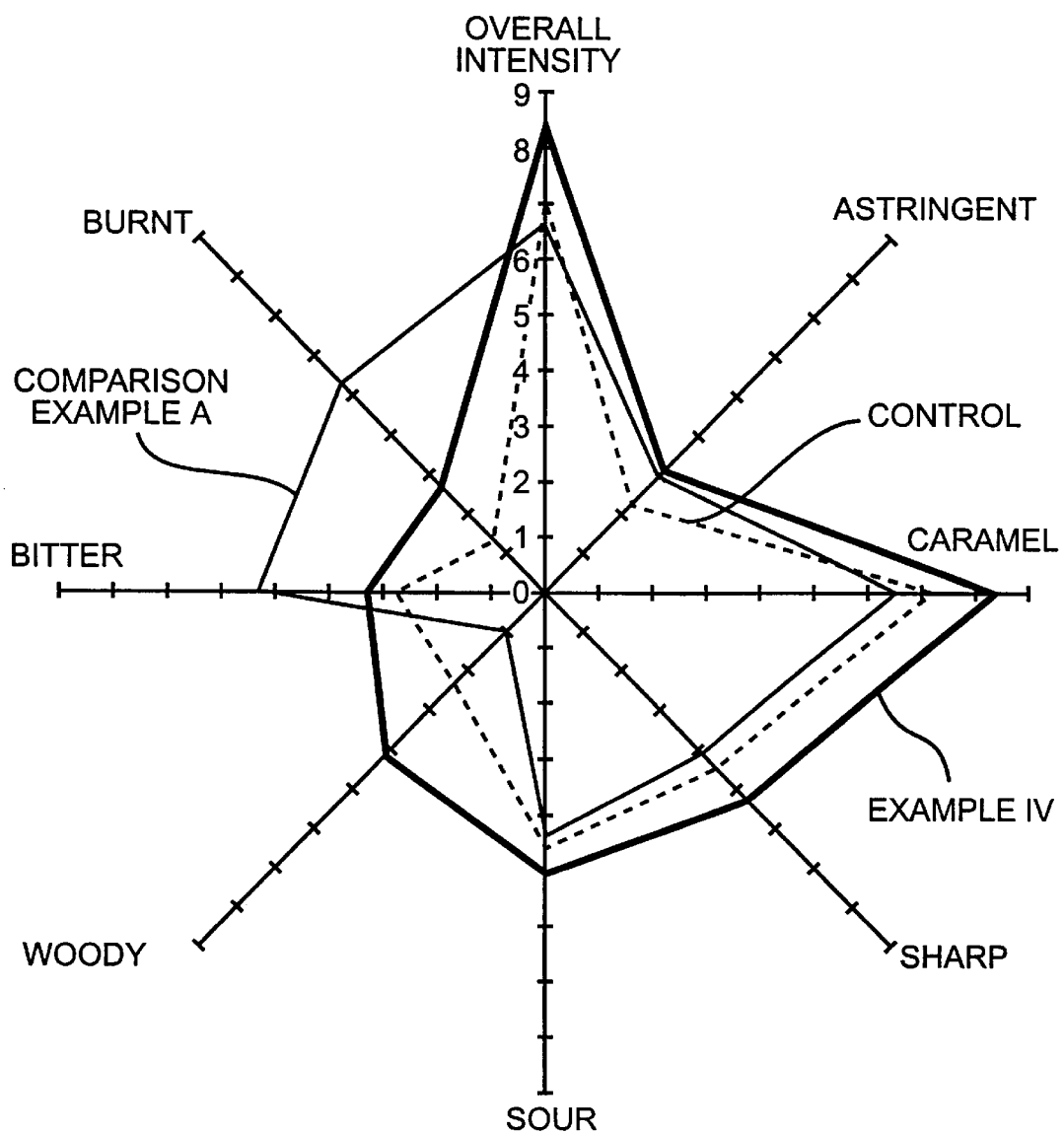
FIG. 3 is a graphical presentation of an evaluation of flavor attributes of three coffee products.

Flavor of the coffee products of Example 4 and Comparison Example A was evaluated on a blind basis by six members of an external panel trained in coffee qualitative descriptive analysis. Flavor intensity attributes are measured on a one to 15 point scale, with a score of one being "none detected". Results are reported in Table 5 and flavor attributes are also depicted in FIG. 3.

TABLE 5

| Flavor Attribute | Control (Untreated) | Example IV (Extruded at 148° C.) | Comparison Ex.A (Extruded at 178° C.) |
| --- | --- | --- | --- |
| Overall Intensity | 7.2 | 8.4 | 6.7 |
| Astringent | 2.3 | 3.2 | 3.0 |
| Caramel | 7.2 | 8.4 | 6.6 |
| Sharp | 4.5 | 5.3 | 4.1 |
| Sour | 4.6 | 5.1 | 4.4 |
| Woody | 2.4 | 4.2 | 1.0 |
| Bitter | 2.8 | 3.3 | 5.3 |
| Burnt | 1.3 | 2.7 | 5.3 |

It can be seen from Table 5 that the product heated at the lower temperature provides a higher flavor intensity while the product heated at the higher temperature results in a flavor intensity that is lower than that of the unheated control. The high temperature product also has significantly higher bitter and burnt character.

Purge and trap aroma analysis of the product of Example IV and the product of Comparison Example A is reported in Table 6.

TABLE 6

| | AROMA ANALYSIS | | | | |
| --- | --- | --- | --- | --- | --- |
| Component | Control (Unheated) (ug/g) | Example IV (Extruded at 148° C.) (ug/g) | Change (%) | Comparison Ex. A (Extruded at 178°) (ug/g) | Change (%) |
| acetaldehyde | 33.0 | 57.0 | +73 | 4.8 | (−85) |
| furan | 1.5 | 2.2 | +47 | 0.1 | (−93) |
| isobutyraldehyde | 20.0 | 24.0 | +20 | 2.0 | (−90) |
| diacetyl | 4.4 | 5.4 | +23 | 5.1 | +16 |
| 2-methylfuran | 30.0 | 32.0 | +7 | 2.2 | (−93) |
| isovaleraldehyde | 76.0 | 74.0 | (−3) | 13.0 | (−83) |
| 2-methylbutanal | 42.0 | 44.0 | +5 | 6.9 | (−84) |
| 2,3-pentanedione | 2.6 | 1.4 | (−46) | 0.5 | (−81) |
| furfural | 10.0 | 24.0 | +140 | 19.0 | +90 |
| others | 118.5 | 138.0 | +16 | 103.4 | (−13) |
| total aroma | 338.0 | 402.0 | +19 | 157.0 | (−54) |

EXAMPLE V

A 2.0 g sample of the extruded and ground coffee product of Example III Run no. 1 is placed in a beaker and reconstituted with 8 oz. of 180° F. water. The product dissolves instantaneously to provide a beverage darker in color and stronger in flavor relative to a control product made with an unheated sample of the same coffee. Further dilution of the treated sample with additional water indicates that its flavor is intensified to ≈1.5×. That is, 2.0 g of the treated sample in 12 oz. water has similar color and flavor intensity to the same weight of untreated sample in 8 oz. water. In addition, the flavor of the treated sample is judged to be less harsh, increased roasted character, slightly burnt and somewhat groundsy relative to the untreated sample. The product can be used at a lower level, in this case ≈1.3 g in 8 oz. water, to provide flavor and color comparable to a 2.0 g control or used at the same weight to provide a beverage with stronger flavor and darker color.

EXAMPLE VI

A 2.0 g sample of the heat treated and ground soluble coffee product of Example III is mixed with 10.0 g granulated sugar, 5.0 g spray-dried non-dairy creamer, and 0.5 g of vanilla flavor. The mixture is placed in a beaker and reconstituted with 8 oz. of 180° F. water. The mixture dissolves to provide a beverage darker in color and stronger in flavor relative to a control product made with an unheated sample of the same soluble coffee. The sample containing the treated coffee provides a significantly darker cup color and stronger coffee impact. A similar mixture is prepared using only 1.4 g of the treated coffee. In this case, the reconstituted beverage provides cup color and coffee impact comparable to the control beverage made with 2.0 g of untreated coffee.

EXAMPLE VII

A 1.5 g sample of the heat treated and ground soluble coffee product of Example III is mixed with 4.0 g of a roasted and ground coffee and sealed in a 2-3/8"×3" filter bag of the type conventionally used to prepare single-cup servings of coffee. The bag is placed in a 10 oz. beaker and reconstituted with 8 oz. of 180° F. water. The coffee extracts well to provide a beverage darker in color and stronger in flavor relative to a control product made with an unheated sample of the same coffee. In addition, the flavor of the treated sample is judged to be somewhat more groundsy and of higher quality relative to the untreated sample.

What is claimed is:

1. A method of intensifying the flavor of soluble coffee comprising heating particulate soluble coffee at a temperature of from 100 to 160° C. for a time sufficient to intensify the flavor of the coffee without causing carbohydrate pyrolysis characterized by evolution of carbon dioxide, and cooling the heated soluble coffee to produce a soluble coffee product having intensified flavor.

2. A method according to claim 1 wherein the flavor of the coffee product is intensified by a factor of at least 1.1 times the flavor of the soluble coffee.

3. A method according to claim 1 wherein the flavor of the coffee product is intensified by a factor of at least 1.3 times the flavor of the soluble coffee.

4. A method according to claim 1 wherein the flavor of the coffee product is intensified by a factor of at least 1.5 times the flavor of the soluble coffee.

5. A method according to claim 1, wherein said heating causes a weight loss of the coffee including loss of moisture, of not more than 8% by weight based on the weight of the soluble coffee.

6. A method according to claim 1 wherein said heating is effected without causing the soluble coffee to melt.

7. A method according to claim 6 wherein said heating is effected in an oven.

8. A method according to claim 1 wherein said heating causes said soluble coffee to melt and wherein said cooling causes the melted coffee to solidify.

9. A method according to claim 8 further comprising comminuting said soluble coffee product to produce a particulate soluble coffee product having a particle size of not more than about 5,000 μm.

10. A method according to claim 8 wherein said heating is effected while passing said soluble coffee through an extruder.

11. A method according to claim 10 wherein said heating is effected at a temperature of from 120 to 150° C.

12. A method according to claim 1 wherein said heating is effected at a temperature of from 130 to 140° C.

13. A method according to claim 1, 11 or 12 wherein said heating is effected for from 0.1 to 180 minutes.

14. A method according to claim 1, 11 or 12 wherein said heating is effected for from 0.15 to 30 minutes.

15. A method according to claim 1, 11 or 12 wherein said heating is effected for from 0.20 to 5 minutes.

16. A method according to claim 8 further comprising injecting a gas into the melted coffee prior to said cooling to reduce the density of solidified coffee product.

17. A method according to claim 1 wherein said soluble coffee is at least one member selected from the group consisting of spray-dried coffee powder, agglomerated soluble coffee, freeze-dried coffee, and soluble coffee solids derived from acid or thermal hydrolysis of spent coffee grounds.

18. A method according to claim 17 wherein said soluble coffee comprises spray-dried coffee powder.

* * * * *